US011103917B2

(12) United States Patent
Maruno et al.

(10) Patent No.: US 11,103,917 B2
(45) Date of Patent: Aug. 31, 2021

(54) ORBITAL FORGING DEVICE, METHOD FOR ORBITAL FORGING, METHOD FOR MANUFACTURING HUB UNIT BEARING USING METHOD FOR ORBITAL FORGING, AND METHOD FOR MANUFACTURING VEHICLE

(71) Applicant: NSK LTD., Tokyo (JP)

(72) Inventors: Tetsurou Maruno, Kanagawa (JP); Nobuyuki Hagiwara, Kanagawa (JP); Tokumasa Kikuchi, Kanagawa (JP); Hiroshi Koyama, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/490,305

(22) PCT Filed: Feb. 28, 2018

(86) PCT No.: PCT/JP2018/007486
§ 371 (c)(1),
(2) Date: Aug. 30, 2019

(87) PCT Pub. No.: WO2018/159670
PCT Pub. Date: Sep. 7, 2018

(65) Prior Publication Data
US 2020/0009642 A1 Jan. 9, 2020

(30) Foreign Application Priority Data
Mar. 2, 2017 (JP) .............................. JP2017-038933

(51) Int. Cl.
B21K 1/40 (2006.01)
F16C 23/08 (2006.01)
(52) U.S. Cl.
CPC ................ B21K 1/40 (2013.01); F16C 23/08 (2013.01); F16C 2326/02 (2013.01)

(58) Field of Classification Search
CPC .................................... B21K 1/40; B21J 9/025
See application file for complete search history.

(56) References Cited

U.S. PATENT DOCUMENTS 3,523,442 A * 8/1970 Marciniak .................. B21J 9/06
72/406
4,698,992 A 10/1987 Bernet
2013/0146380 A1 6/2013 Webster et al.

FOREIGN PATENT DOCUMENTS

DE 10 2015 115 293 A1 3/2016
EP 0 383 578 A2 8/1990
(Continued)

OTHER PUBLICATIONS

Extended European Search Report dated Jul. 1, 2020, issued by the European Patent Office in application No. 18761668.5.
(Continued)

Primary Examiner — Jason L Vaughan
(74) Attorney, Agent, or Firm — Sughrue Mion, PLLC

(57) ABSTRACT

Provided is construction which is able to downsize an orbital forging device comprising a spherical seat with shaft that swings and rotates with a molding die. The end section on the other side in the axial direction of the swinging shaft 13 is supported with respect to the driving mechanism 17 in a state where the movement toward one side in the axial direction (lower side) is prevented, and a member for preventing the swinging shaft 13 from moving toward the one side in the axial direction with respect to the frame 10 is not assembled in a section which is located between the convex spherical seat 14 and the driving mechanism 17 in the axial direction of the swinging shaft 13.

4 Claims, 7 Drawing Sheets

(56) References Cited

FOREIGN PATENT DOCUMENTS

| EP | 2684626 A1 * | 1/2014 | ............. B21K 25/00 |
|---|---|---|---|
| EP | 3 306 125 A1 | 4/2018 | |
| FR | 1560475 A | 3/1969 | |
| GB | 319065 A | 9/1929 | |
| JP | 50-048841 U | 5/1975 | |
| JP | 60-227939 A | 11/1985 | |
| JP | 1-317650 A | 12/1989 | |
| JP | 2-197345 A | 8/1990 | |
| JP | H02 108537 U | 8/1990 | |
| JP | 2-251330 A | 10/1990 | |
| JP | 2000-343905 A | 12/2000 | |
| JP | 2003-083353 A | 3/2003 | |
| JP | 2013-091067 A | 5/2013 | |
| JP | 2015-77616 A | 4/2015 | |
| JP | 2017-002926 A | 1/2017 | |
| SU | 517514 A1 | 6/1976 | |

OTHER PUBLICATIONS

International Search Report for PCT/JP2018/007486 dated May 29, 2018.
Communication dated Oct. 6, 2020, from the Japanese Patent Office in application No. 2019125653.
Communication dated Jun. 21, 2021, issued by the European Patent Office in counterpart European Application No. 18761668.5.

* cited by examiner

ORBITAL FORGING DEVICE, METHOD FOR ORBITAL FORGING, METHOD FOR MANUFACTURING HUB UNIT BEARING USING METHOD FOR ORBITAL FORGING, AND METHOD FOR MANUFACTURING VEHICLE

CROSS REFERENCE TO RELATED APPLICATIONS

This application is a National Stage of International Application No. PCT/JP2018/007486 filed Feb. 28, 2018, claiming priority based on Japanese Patent Application No. 2017-038933, filed Mar. 2, 2017.

TECHNICAL FIELD

The present invention relates to an orbital forging device and a method for orbital forging which are used for forming a crimped portion by plastically deforming a cylindrical section provided in an end section in the axial direction of a shaft member such as a hub outward in the radial direction. The present invention also relates to a method for manufacturing a hub unit bearing using this method for orbital forging, and a method for manufacturing a vehicle using this method for manufacturing a hub unit bearing.

BACKGROUND ART

In vehicles such as automobiles, wheels are rotatably supported to a suspension respectively by a hub unit bearing such as illustrated in FIG. 4.

The hub unit bearing illustrated in FIG. 4 comprises an outer ring 1 that does not rotate in use with connected and fastened to a suspension, a hub 2 that rotates in use with a wheel supported and fixed thereto, and balls 5 as a plurality of rolling elements that are rollably provided between double-row outer ring raceways 3a, 3b provided on the inner circumferential surface of the outer ring 1 and double-row inner ring raceways 4a, 4b provided on the outer circumferential surface of the hub 2.

The hub 2 is constructed by connecting and fastening a hub body 6 in which the inner ring raceway 4a on the outside (left side in FIG. 4) in the axial direction is formed on the outer circumferential surface and an inner ring 7 in which the inner ring raceway 4b on the inside (right side in FIG. 4) in the axial direction is formed on the outer circumferential surface. The hub 2 corresponds to a shaft member. More specifically, in a state where the inner ring 7 is externally fitted onto the section near the inner end in the axial direction of the hub body 6, the inner end section in the axial direction of the cylindrical section 8 which is provided in the inner end section in the axial direction of the hub body 6 is plastically deformed outward in the radial direction so as to form a crimped portion 9, and the hub 2 is constructed by pressing the inner end surface in the axial direction of the inner ring forcefully by the crimped portion 9. In the hub unit bearing, the outside in the axial direction or the inside in the axial direction means outside in the width direction or inside in the width direction of a vehicle in a state where the hub unit bearing is mounted in a vehicle.

In vehicles having relatively light weight such as automobiles, it is common that wheels are supported to a vehicle by a hub unit bearing using balls 5 as rolling elements. However, in heavy vehicles such as trucks, as disclosed in JP2000-343905(A) and JP2003-083353(A) and illustrated in FIG. 5, wheels are supported to a vehicle by a hub unit using tapered rollers 5a as rolling elements.

The crimped portion 9 is, for example, formed by orbital forging. In this case, for example, as illustrated in FIG. 6, in a state where the center axis 8 of the molding die 15 is inclined to a predetermined angle θ (for example, about 1 degree to 5 degrees) with respect to the center axis a of the hub body 6, the molding die 15 is pressed to the inner end section in the axial direction of the cylindrical section 8. In this state, the molding die 15 is made to swing and rotate (i.e. revolve) around the center axis a of the hub body 6. When doing this, the molding die 15 rotates around its center axis 8 based on the friction force that acts on the contact portion thereof with the inner end section in the axial direction of the cylindrical section. Due to this, by applying axial outward and radial outward load to a portion in the circumferential direction of the cylindrical section 8 as well as by continuously changing the portion where this load has been applied in relation to the circumferential direction, as illustrated in FIG. 6, the inner end section in the axial direction of the cylindrical section 8 is plastically deformed gradually so as to form a crimped portion 9.

In the hub unit bearing comprising in which the hub 2 is formed by pressing down the inner end section in the axial direction of the inner ring 7 with the crimped portion 9, in order to prevent creep between the hub body 6 and the inner ring 7, the force to press down the inner end section in the axial direction of the inner ring 7 with the crimped portion 9 is required to be large. However, when the inclination angle θ of the center axis 8 of the molding die 15 with respect to the center axis a of the hub body 6 is small like 5 degrees or less, machining load for forming the crimped portion 9 becomes large, so it becomes difficult to adjust the force to press down the inner end section in the axial direction of the inner ring 7 with the crimped portion 9. When the force for pressing down the inner end section in the axial direction of the inner ring 7 with the crimped portion 9 becomes excessively large, there may be a case where the inner ring 7 plastically deforms as if the inner ring raceway 4b on the inside in the axial direction provided on the outer circumferential surface expands. When the inner ring 7 plastically deforms, problems arise such as the preload that is given to the rolling elements become unstable. Especially, the effect due to the plastic deformation of the inner ring 7 is remarkable in the hub unit bearing using tapered rollers 5a as rolling elements as illustrated in FIG. 5.

As a device for performing such orbital forging, JP2013-091067(A) and JP2015-077616(A) disclose an orbital forging device comprising a spherical seat with shaft. FIG. 7 illustrates an example of an orbital forging device disclosed in JP2013-091067(A), the orbital forging device comprising a connected body 23 of a spherical seat with shaft 12 and a molding die 15.

The spherical seat with shaft 12 comprises a swinging shaft 13 and a convex spherical seat 14 that is integrally formed so as to be coaxial with the swinging shaft 13 at the end section on one side in the axial direction (lower end portion in FIG. 7) of the swinging shaft 13. Of the convex spherical seat 14 of the spherical seat with shaft 12, on one side section in the axial direction of the swinging shaft 13, the molding die 15 is held and fixed to so as to be coaxial with the swinging shaft 13. The other side section in the axial direction of the swinging shaft 13 of the convex spherical seat 14 (upper side portion in FIG. 7) spherically engages with the concave spherical seat 16 that is fixed to the frame of the orbital forging device.

The end section on the other side in the axial direction of the swinging shaft 13 of the spherical seat with shaft 12 is connected to a driving mechanism that is assembled in the frame of the orbital forging device via a rolling bearing 28 of this driving mechanism. Further, a thrust sliding bearing 42 having a partially spherical sliding surface is assembled between the intermediate section in the axial direction of the swinging shaft 13 and the frame (concave spherical seat 16).

In such an orbital forging device, driving force for swinging and rotating the spherical seat with shaft 12 and the molding die 15 is given from the driving mechanism to the end section on the other side in the axial direction of the swinging shaft 13. Further, due to the spherical engagement between the convex spherical seat 14 and the concave spherical seat 16, swing and rotation of the spherical seat with shaft 12 and the molding die 15 are allowed and processing reaction force applied to molding die 15 is supported. Further, swing and rotation of the spherical seat with shaft 12 and the molding die 15 is allowed by the thrust sliding bearing 42, and the spherical seat with shaft 12 and the molding die 15 are prevented from moving to the one side in the axial direction of the swinging shaft 13 with respect to the frame (the driving mechanism and the concave spherical seat 16), that is, dropping from the orbital forging device.

In the conventional orbital forging device, the connecting section between the end section on the other side in the axial direction of the swinging shaft 13 and the driving mechanism does not have a function that prevents the spherical seat with shaft 12 and the molding die 15 from moving to the one side in the axial direction of the swinging shaft 13 with respect to the frame (the driving mechanism and the concave spherical seat 16), instead the thrust sliding bearing 42 has this function.

PRIOR ART DOCUMENTS

Patent Literature

[Patent Literature 1] JP2000-343905 (A)
[Patent Literature 2] JP2003-083353 (A)
[Patent Literature 3] JP2013-091067 (A)
[Patent Literature 4] JP2015-077616 (A)

SUMMARY OF INVENTION

Problem to be Solved by Invention

In the conventional orbital forging device, a thrust sliding bearing 42 having a partially spherical sliding surface is assembled between the intermediate section in the axial direction of the swinging shaft 13 and the frame (concave spherical seat 16). Therefore, it is required to secure installation space for this thrust sliding bearing 42 and thus the size of the orbital forging device becomes larger. Further, the partially spherical sliding surface of the thrust sliding bearing 42 is required to be formed highly precisely, so the cost for manufacturing an orbital forging device becomes higher.

Further, when forming the crimped portion 9 of the hub unit bearing by orbital forging, the swing angle of the molding die 15 (inclination angle $\theta$ of the center axis 8 of the molding die 15 with respect to the center axis a of the hub body 6) is thought to be preferable to be set at 15 degrees or more and 30 degrees or less from the view point of suppressing deformation of the inner ring 7 when forming the crimped portion 9 and suppressing the maximum machining load at low level so as to make the size of the orbital forging device smaller (see JP2015-077616(A)). However, in the conventional orbital forging device, if the swing angle $\theta$ of the molding die 15 is set to be 15 degrees or more, the outer diameter dimension of the thrust sliding bearing 42 becomes larger as well, so problems such as increasing in size and manufacturing cost become remarkable.

Taking into consideration the problems described above, the object of the present invention is to provide construction which is able to set the swing angle of the molding die to be large at 15 degrees or more and 30 degrees or less and to reduce size of an orbital forging device as well as its manufacturing cost for the orbital forging device comprising a spherical seat with shaft that swings and rotates with a molding die.

Means for Solving Problems

The orbital forging device of the present invention comprises a frame, a swinging shaft, a convex spherical seat, a molding die, a concave spherical seat, and a driving mechanism.

The frame has a reference axis.

The swinging shaft comprises a center axis, an end section on one side in the axial direction, and an end section on the other side in the axial direction, and the center axis is arranged so as to be inclined to the reference axis.

The convex spherical seat comprises one side section in the axial direction of the swinging shaft, the other side section in the axial direction of the swinging shaft, and a convex spherical surface section provided on the other side section, and is connected at the end section on the one side section in the axial direction of the swinging shaft so as to be coaxial with the swinging shaft.

The molding die comprises a machining surface section in a side surface on the one side in the axial direction of the swinging shaft, and is connected to the one side section of the convex spherical seat so as to be coaxial with the swinging shaft.

The concave spherical seat is fixed to the frame and comprises a concave spherical surface section that spherically engages with the convex spherical surface section and an insertion hole to which the swinging shaft is inserted.

The driving mechanism is assembled in the frame and is connected to the end section on the other side in the axial direction of the swinging shaft so as to provide driving force for rotating a connected body of the swinging shaft, the convex spherical seat, and the molding die around the reference axis to the end section on the other side in the axial direction of the swinging shaft.

Especially, in the orbital forging device of the present invention, the end section on the other side in the axial direction of the swinging shaft is supported to the driving mechanism in a state where a movement thereof toward the one side in the axial direction is prevented.

In the present invention, for example, it is possible to employ construction where the driving mechanism comprises a rotating body which is supported to the frame so as to be able to rotate around the reference axis, a retention hole which is provided in the rotating body and to which the end section on the other side in the axial direction of the swinging shaft is inserted, and a rolling bearing which is provided between the retention hole and the end section on the other side in the axial direction of the swinging shaft, and the end section on the other side in the axial direction of the swinging shaft is supported to the rotating body by the rolling bearing in a state where a movement thereof toward the one side in the axial direction is prevented.

In the present invention, for example, it is possible to employ construction where the rolling bearing comprises an outer ring, an inner ring, and a plurality of rolling elements located between the outer ring and the inner ring, and is able to support axial load that acts on between the outer ring and the inner ring, and the inner ring is externally fitted onto the end section on the other side in the axial direction of the swinging shaft in a state where a displacement thereof to the other side in the axial direction of the swinging shaft is prevented, and the outer ring is fitted inside the retention hole in a state where a displacement thereof to the one side in the axial direction of the swinging shaft is prevented.

In the present invention, for example, it is possible to employ construction in which the rotating body has a case member supported to the frame so as to be able to rotate around the reference axis, and a bearing holder having the retention hole, and the bearing holder is detachably fixed to the case member.

In the present invention, for example, it is possible to employ construction which further comprises a holding member which is detachably fixed to the case member in addition to the case member and the bearing holder.

In this case, the case member comprises a bottomed holding recess section that opens in a side surface opposite to the molding die with respect to a direction of the reference axis and a through-hole which is formed in a part of a section that corresponds to a bottom section of the holding recess section.

The bearing holder further comprises an outer circumferential surface, and a first inclined surface section that is formed in a portion in the circumferential direction of the outer circumferential surface and is inclined in a direction toward the retention hole with respect to a direction that is perpendicular to the reference axis toward an opposite side to the molding die with respect to the direction of the reference axis.

The holding member comprises an outer circumferential surface and a second inclined surface section that is formed in a part in the circumferential direction of the outer circumferential surface and is able to make a surface contact with the first inclined surface section.

The bearing holder and the holding member are fitted inside the holding recess section in a state where the first inclined surface section and the second inclined surface section come in contact, and preload in a direction toward a bottom section side of the holding recess section is applied to the holding member.

The end section on the other side in the axial direction of the swinging shaft is inserted to the through-hole of the case member and the retention hole of the bearing holder.

In the present invention, the inclination angle of the center axis of swinging shaft with respect to the reference axis can be 15 degrees or more and 30 degrees or less.

The method for orbital forging of the present invention comprises a step of plastically deforming a cylindrical section provided in an end section in an axial direction of a shaft member outward in a radial direction thereof to form a crimped portion, in which, using the orbital forging device of the present invention, the molding die is pressed to the end section in the axial direction of the cylindrical section of the shaft member in a state where the center axis of the molding die is inclined to the center axis of the shaft member to a predetermined angle.

The inclination angle of the center axis of the molding die with respect to the center axis of the shaft member can be set to be 15 degrees or more and 30 degrees or less.

In a method for manufacturing a hub unit bearing of the present invention, the hub unit bearing comprises:

an outer ring that does not rotate in use with connected and fastened to a suspension, a hub that rotates together with a wheel in use with the wheel supported and fastened thereto, and a plurality of rolling elements that are rollingly arranged between double-row outer ring raceways provided on an inner circumferential surface of the outer ring and double-row inner ring raceways provided on an outer circumferential surface of the hub, and the hub comprises a hub body having an inner ring raceway on an outside in the axial direction of the double-row inner ring raceways on an outer circumferential surface thereof, and an inner ring having an inner ring raceway on an inside in the axial direction of the double-row inner ring raceways on an outer circumferential surface thereof, the hub body and the inner ring fastened and fixed to each other, and the method comprises a step of plastically deforming an inner end section in the axial direction of a cylindrical section provided on an inner end section in the axial direction of the hub body outward in the radial direction with the inner ring externally fitted onto a section near an inner end in the axial direction of the hub body using the orbital forging device of the present invention to form a crimped portion and to make the crimped portion press down an inner end surface in the axial direction of the inner ring.

In a method for manufacturing a vehicle of the present invention, the vehicle has a structure in which a wheel is rotatably supported to a suspension of the vehicle by a hub unit bearing, and the method comprises a step of manufacturing the hub unit bearing by using the method for manufacturing the hub unit bearing of the present invention.

Effect of Invention

In the orbital forging device and the method for orbital forging using the orbital forging device of the present invention, the end section on the other side in the axial direction of the swinging shaft is supported to the driving mechanism in a state where the movement thereof toward the one side in the axial direction is prevented. Therefore, due to this supporting section, the connected body of the swinging shaft, the convex spherical seat, and the molding die is prevented from moving toward the one side in the axial direction with respect to the frame.

Further, a member for preventing the swinging shaft from moving toward the one side in the axial direction with respect to the frame, for example, a thrust sliding bearing having a partially spherical sliding surface, is not assembled in a section of the swinging shaft that is located between the convex spherical seat and the driving mechanism with respect to the axial direction.

Therefore, the swing angle of the molding die which is an inclination angle of the swinging shaft with respect to the reference axis can be set to be large at 15 degrees or more and 30 degrees or less, and it is possible to reduce the size of the device and its manufacturing cost.

Further, in the orbital forging device and the method for orbital forging using the orbital forging device of the present invention, when the rotating body of the driving mechanism comprises a case member, and a bearing holder (or a bearing holder and a holding member) which is (are) detachably fixed to the case member, by changing the inclination angle of the retention hole with respect to the reference axis by exchanging the bearing holder (or the bearing holder and the holding member), it is possible to change the swing angle of the molding die, which is an inclination angle of the swinging shaft with respect to the reference axis, in a wide range.

Further, in a method for manufacturing a hub unit bearing and in a method for manufacturing a vehicle including a process of manufacturing a hub unit bearing using this method for manufacturing a hub unit bearing, by employing the orbital forging device and the method for orbital forging of the present invention, it is made possible to manufacture a hub unit in which the deformation of the inner ring is suppressed and to make the device compact and reduce manufacturing cost thereof.

Therefore, the industrial significance of the present invention is very large.

MODES FOR CARRYING OUT INVENTION

Figure 1:
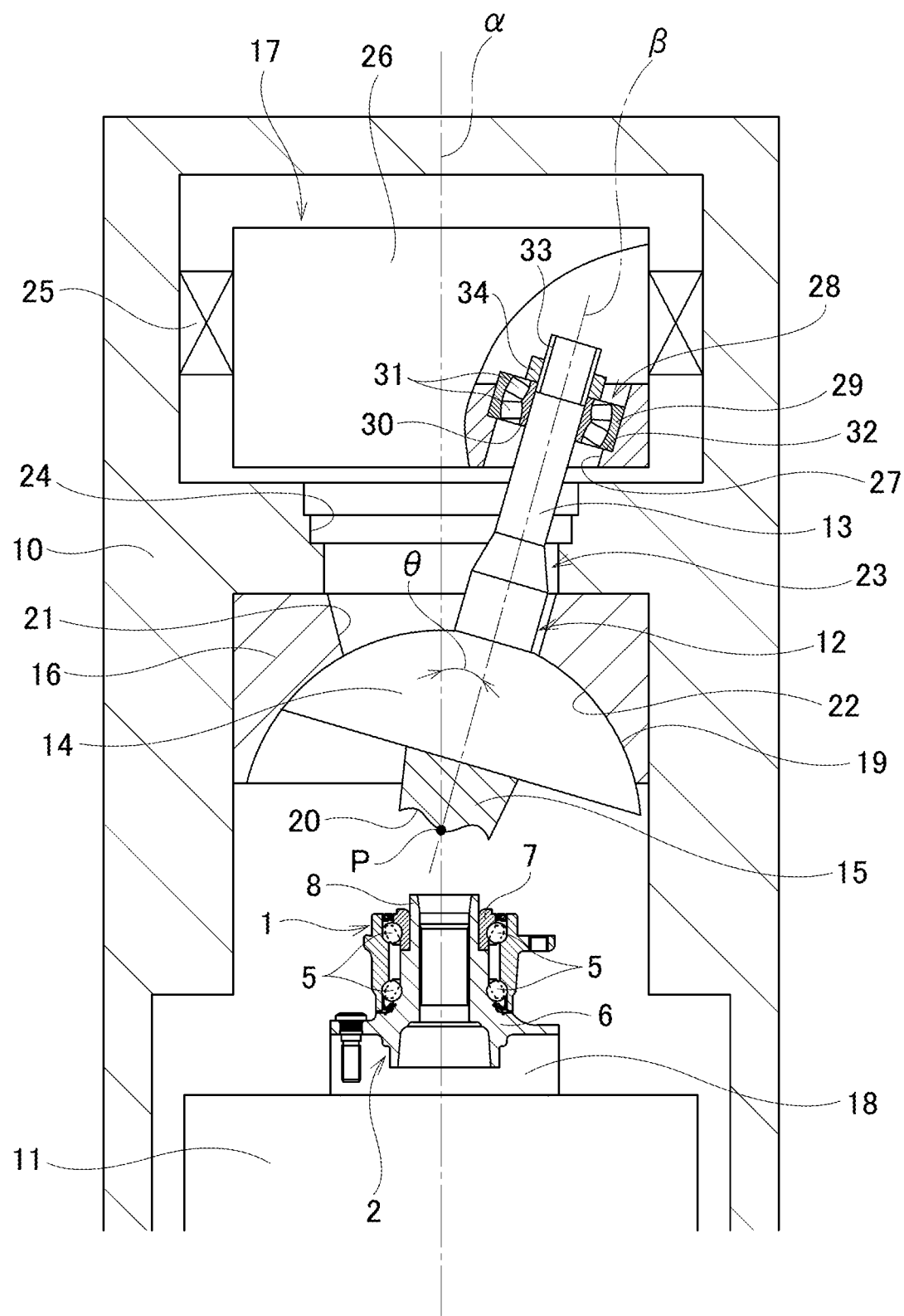
FIG. 1 is a schematic cross-sectional view illustrating the orbital forging device of an example of an embodiment of the present invention.

An example of an embodiment of the present invention will be explained with reference to FIG. 1 to FIG. 5. The orbital forging device of the present example is used for forming a crimped portion 9 of the hub unit bearing illustrated in FIG. 4 or FIG. 5. This orbital forging device comprises a frame 10, an elevating base 11, a spherical seat with shaft 12 (provided with a swinging shaft 13 and a convex spherical seat 14), a molding die 15, a concave spherical seat 16, and a driving mechanism 17.

The frame 10 is placed on a floor of a factory and the like. The frame 10 has a reference axis a in the vertical direction. In other words, the reference axis a is set in the vertical direction of the frame 10.

The elevating base 11 is located at the lower section in the frame 10 so as to be able to move up and down along the reference axis a. To the elevating base 11, a hydraulic mechanism (not shown) for driving this elevating base 11 up and down is connected. A support jig 18 for supporting the hub body 6, which is a work piece, without rattle in relation to the radial direction is provided at the top surface of the elevating base 11.

The spherical seat with shaft 12 comprises a swinging shaft 13 which has a center axis 8 and extends along the center axis 13, and a convex spherical seat 14 which is connected to the swinging shaft 13 so as to be coaxial with the swinging shaft 13 at the end section on one side in the axial direction (the lower end section in FIG. 1). The spherical seat with shaft 12 is arranged above the elevating base 11 in the frame in a state where the center axis 8 is tilted at a predetermined angle θ to the reference axis a. The convex spherical seat 14 is connected to the swinging shaft 13 on the other side section in the axial direction (the upper side section in FIG. 1) of the swinging shaft 13. The other side section in the axial direction of the swinging shaft 13 of the convex spherical seat 14 is, except for the section which is connected to the swinging shaft 13 of the convex spherical seat 14, composed of a convex spherical surface section 19. The center of curvature of the convex spherical surface section 19 exists on the center axis 8 of the swinging shaft 13. Therefore, the swinging shaft 13 and the convex spherical seat 14 are arranged coaxially. Such spherical seat with shaft 12 may be formed so as to be integral as a whole, or formed by combining plural parts.

The molding die 15 is connected to one side section of the convex spherical seat 14 in the axial direction of the swinging shaft 13 so as to be coaxial with the swinging shaft 13. The side surface of the molding die 15 on one side with relation to the axial direction of the swinging shaft 13 comprises a machining surface section 20 which is annular and coaxial with the center axis 13 of the swinging shaft 13. Such molding die 15 may be formed so as to be separate from the spherical seat with shaft 12, or may be formed so as to be integral with the entire spherical seat with shaft 12 or to be integral with some parts of the spherical seat with shaft 12.

The concave spherical seat 16 is fixed to the intermediate section in the vertical direction of the frame 10. This concave spherical seat 16 comprises a concave spherical surface section 22 that spherically engages with the convex spherical surface section 19 of the convex spherical seat 14 and an insertion hole 21 to which the end section on the one side in the axial direction of the swinging shaft 13 is inserted. The center of curvature of the concave spherical surface section 22 exists on the reference axis a. Such concave spherical seat 16 allows the connected body 23 of the molding die 15 and the spherical seat with shaft 12 swing and rotate (i.e. revolve) around the reference axis a based on making the convex spherical surface section 19 spherically engage with the concave spherical surface section 22, and allows the connected body 23 rotates around the center axis 13, as well as support machining reaction force that is applied to the molding die 15 when performing orbital forging.

In the present example, the insertion hole 21 of the concave spherical seat 16 is composed of a tapered hole having an inner diameter dimension that becomes larger toward the above. Further, a portion of the inner circumferential surface of the frame 10 which is adjacent above the insertion hole 21 of the concave spherical seat 16 and to which the intermediate section in the axial direction of the swinging shaft 13 is inserted, is composed of a stepped hole 24 having an inner diameter dimension that becomes larger step by step toward the above. The inner diameter dimension of these insertion hole 21 and the stepped hole 24 is, as described above, set to be as small as possible within a range that the connected body 23 of the molding die 15 and the spherical seat with shaft 12 does not interfere with the swinging shaft 13 when the connected body 23 swings and rotates around the reference axis a. In the present example, the reason why the portion of the inner circumferential surface of the frame 10 which is adjacent above the insertion hole 21 is made as the stepped hole 24 is due to easiness of processing when using general processing equipment. When embodying the present invention, if it is possible to process, the stepped hole 24 may be changed to a tapered hole having an inner diameter dimension that becomes larger toward the above.

The driving mechanism 17 is assembled in the upper end section in the frame 10. The end section on the other side in the axial direction of the swinging shaft 13 that protrudes upwards from the stepped hole 24 is connected to the driving mechanism 17. The driving mechanism 17 gives driving force to the end section on the other side in the axial direction of the swinging shaft 13 so as to make the connected body 23 of the molding die 15 and the spherical seat with shaft 12 swing and rotate around the reference axis a.

The driving mechanism 17 comprises a rotating body 26, a retention hole 27, and a rolling bearing 28.

The rotating body 26 is supported inside the upper end section of the frame 10 by a bearing device 25 so as to be able to rotate only around the reference axis a. An output section of a motor (not shown) for rotating and driving the rotating body 26 is connected directly or via a reducer (not shown).

The retention hole 27 is provided in a part in the circumferential direction of the intermediate section in the radial direction of the rotating body 26. The center axis of the retention hole 27 is inclined by substantially the same angle as the inclination angle θ with respect to the reference axis a.

The rolling bearing 28 is arranged between the inner circumferential surface of the retention hole 27 and the outer circumferential surface of the end section on the other side in the axial direction of the swinging shaft 13, and supports the end section on the other side in the axial direction of the swinging shaft 13 with respect to the retention hole 27 so as to be able to rotate freely.

Especially, in the present example, due to the rolling bearing 28, the end section on the other side in the axial direction of the swinging shaft 13 is supported to the driving mechanism 17 in a state where the movement toward the one side in the axial direction (drop downward in FIG. 1).

In order to be responsible for the function of preventing the rolling bearing 28 from moving toward the one side in the axial direction, the rolling bearing 28 comprises construction having bearing capacity for axial load in addition to bearing capacity for radial load. In particular, as the rolling bearing 28, a self-aligning roller bearing is used. In this self-aligning roller bearing, a plurality of spherical rollers 31 are rollingly arranged between the inner circumferential surface of the outer ring 29 and the outer circumferential surface of the inner ring 30, and the attitude and the locations of these plurality of spherical rollers 31 are controlled by a cage (not shown). Due to such construction, the rolling bearing 28 can support the radial load that acts on between the outer ring 29 and the inner ring 30 as well as the axial load that acts on between the outer ring 29 and the inner ring 30. Further, even if the center axes of the outer ring 29 and the inner ring 30 are slightly inclined to each other, the rolling bearing 28 has automatic alignment such as to be able to make the rolling of the spherical rollers 31 between the outer ring 29 and the inner ring 30 smooth. Specific construction of such a self-aligning roller bearing is already known, so its explanation is omitted. When embodying the present invention, as the rolling bearing 28, it is possible to use bearings such as a deep groove ball bearings and an angular ball bearing.

The outer ring 29 is fitted inside the retention hole 27 in a state where it is prevented to move toward the one side in the axial direction of the swinging shaft 13. For that, the inner circumferential surface of the retention hole 27 is composed of a stepped hole having a stepped surface 32 facing toward the other side in the axial direction (the upper side in FIG. 1) in the intermediate section in the axial direction. The outer ring 29 is fitted inside a section of the retention hole 27 which locates on the other side in the axial direction than the stepped surface 32 without rattle, and the end surface on the one side in the axial direction of the outer ring 29 comes in contact with the stepped surface 32.

The inner ring 30 is externally fitted onto the end section on the other side in the axial direction of the swinging shaft 13 in a state where it is prevented to move toward the other side in the axial direction of the swinging shaft 13. Therefore, the inner ring 30 is externally fitted onto the end section on the other side in the axial direction of the swinging shaft 13 without rattle, and a nut 34 is screwed and fixed to a male screw section 33 which is provided at the end section on the other side in the axial direction of the swinging shaft 13, and this nut 34 comes in contact with the end surface on the other side in the axial direction of the inner ring 30.

Due to such construction, it is prevented that the end section on the other side in the axial direction of the swinging shaft 13 moves toward the one side in the axial direction with respect to the driving mechanism 17, that is, the connected body 23 is prevented from dropping downwards from the orbital forging device.

In the present example, by adjusting the screwing position of the nut 34 with respect to the male screw section 33 so as to adjust the space between the nut 34 and the convex spherical seat 14, in a state where the machining surface section 20 of the molding die 15 is before pressed to the cylindrical section 8 of the hub body 6, or, in a state where the machining surface section 20 is pressed to the cylindrical section 8, the size of the gap (engagement allowance) which exists in the spherical engagement section between the convex spherical surface section 19 and the concave spherical surface section 22 is optimized.

In the present invention, alternative to construction where the nut 34 is screwed and fixed to the male screw section 33, for example, it is possible to employ construction where the inner ring is externally fitted onto the end section on the other side in the axial direction of the swinging shaft, or construction where a retaining ring which is locked to the end section on the other side in the axial direction of the swinging shaft comes in contact with the end surface of the other side in the axial direction of the swinging shaft of both end surfaces in the axial direction of the inner ring so as to prevent the inner ring which is externally fitted onto the end section on the other side in the axial direction of the swinging shaft from moving toward the other side in the axial direction of the swinging shaft.

Further, alternative to the construction where the end surface on the one side in the axial direction of the outer ring 29 comes in contact with the stepped surface 32, for example, it is possible to employ construction where the outer ring is fitted inside the retention hole with interference fit, or construction where a nut which is screwed and fixed to the retention hole or a retaining ring which is locked to the retention hole comes in contact with the end surface of the one side in the axial direction of the swinging shaft of both end surfaces in the axial direction of the outer ring so as to prevent the outer ring which is fitted inside the retention hole from moving toward the one side in the axial direction of the swinging shaft.

Figure 2A:
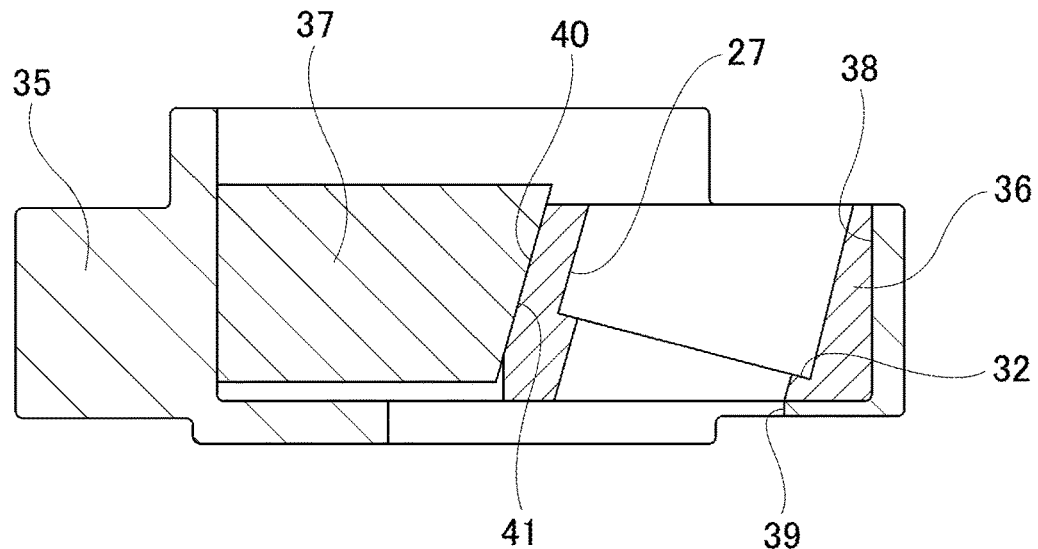
FIG. 2(a) is a cross-sectional view which specifically illustrates part of the rotating body of the driving mechanism of the orbital forging device illustrated in FIG. 1.
Figure 2B:
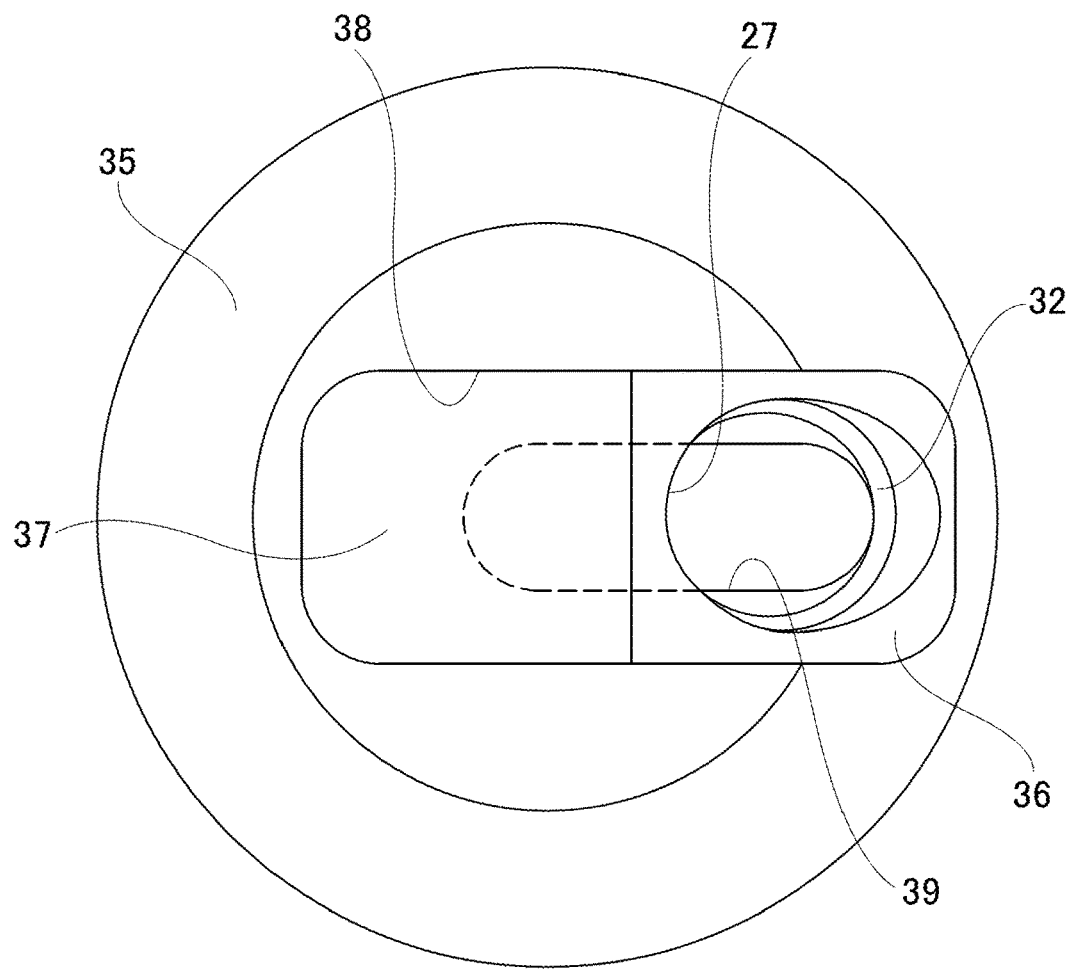
FIG. 2(b) is a plan view which specifically illustrates parts of the rotating body of the driving mechanism of the orbital forging device illustrated in FIG. 1.

In the present example, as illustrated in FIG. 2(a) and FIG. 2(b), the rotating body 26 comprises a case member 35, and a bearing holder 36, and a holding member 37 that are detachably fixed to the case member 35.

The case member 35 constitutes the lower section of the rotating body 26, has a thick disc shape, and is arranged so as to be coaxial with the reference axis a. The case member 35 has a bottomed holding recess section 38 which is open to the upper side surface which is the surface opposite to the molding die 15. As illustrated in FIG. 2(b), the shape of the holding recess section 38 as seen from above is rectangular which extends in the radial direction about the reference axis a. Further, the case member 35 has a through-hole 39 in a part of a section which corresponds to a bottom section of the holding recess section 38. This through-hole 39 is also provided in a state it extends in the same direction as the extending direction of the holding recess section 38.

The bearing holder 36 is fitted inside one side half section in the longitudinal direction (right half section in FIG. 2) without rattle. On the other hand, the holding member 37 is fitted inside the other half section in the longitudinal direction of the holding recess section 38 (left half section in FIG. 2) without rattle.

The bearing holder 36 has an approximately square cylinder shape, and a retention hole 27 is provided inside the radial direction thereof. The first inclined surface section 40 is provided at the end section on the other side (left side in FIG. 2(a)) in the longitudinal direction of the holding recess section 38 on the outer circumferential surface of the bearing holder 36. The first inclined surface section 40 is inclined in a direction toward the retention hole 27 in relation to the direction which is orthogonal to the reference axis a (the left-right direction in FIG. 2(a)) toward the side opposite to the molding die 15 (the upper side in FIG. 2(a) in relation to direction of the reference axis a (the up-down direction in FIG. 2(a)). In the present example, the first inclined surface section 40 is inclined in the same direction at the same angle as the retention hole 27.

The holding member 37 has an approximately rectangular parallelepiped shape, and the second inclined surface section 41 is provided at the end section on the one side (the right side in FIG. 2(a)) in relation to the longitudinal direction of the holding recess section 38 on the outer circumferential surface of the holding member 47. The second inclined surface section 41 is inclined in the same direction at the same angle as the first inclined surface section 40.

In this state, while the lower surface of the bearing holder 36 comes in contact with the bottom section of the holding recess section 38, the lower surface of the holding member 37 faces to the bottom section of the holding recess section 38 via a gap.

In the present example, for example, preload in the direction toward the bottom section side (the lower side in FIG. 2(a)) of the holding recess section 38 is applied to the holding member 37 due to tightening force of a holding bolt (not shown). Due to this, wedge effect occurs at the engagement section between the first inclined surface section 40 and the second inclined surface section 41 so that strict location control of the bearing holder 36 with respect to the holding recess section 38 is done. Further, in this state, axial force is applied to the holding bolt due to elastic deformation of the holding member 37 so that occurrence of loosening of the holding bolt by the vibration that occurs when performing orbital forging is effectively prevented.

Although illustration is omitted, as a further safety measure, it is also possible to employ construction where the holding member 37 is prevented from rising upwards by pressing down the top surface of the holding member 37 by a lid member which is connected and fixed to the case member 35 with bolts or the like.

In any case, in the present example, the bearing holder 36 and the holding member 37 are detachably fixed to the case member 35 based on attachment and detachment of the holding bolt or the lid member or the like as described above.

In the present example, the end section on the other side in the axial direction of the swinging shaft 13 is inserted into the retention hole 27 of the bearing holder 36 through the through-hole 39 of the case member 35.

Further, a member which prevents the swinging shaft 13 from moving toward the one side in the axial direction with respect to the frame, that is, which prevents the connected body 23 of the molding die 15 and the spherical seat with shaft 12 from moving toward the one side in the axial direction of the swinging shaft 13 with respect to the frame, for example, a thrust sliding bearing having a partially spherical sliding surface, is not assembled in a portion of the swinging shaft 13 which is located between the convex spherical seat 14 and the driving mechanism 17 in the axial direction.

In the present example, the inclination angle θ, which is a swing angle of the molding die 15 when performing orbital forging, is set to be 15 degrees or more and 30 degrees or less. In the present example, in spite of such large inclination angle θ, space for placing a member such as a thrust sliding bearing in the frame 10 is not required, because a mechanism for preventing the swinging shaft 13 from moving toward the one side in the axial direction with respect to the frame 10 is provided at the connecting section of the driving mechanism 17 and the other end section in the axial direction of the swinging shaft 13. Accordingly, reduction in size of the device and its manufacturing cost is achieved.

When forming a crimped portion 9 at the inner end section in the axial direction of the hub body 6 by using the orbital forging device of the present example having such construction, as illustrated in FIG. 1, in a state where the hub body 6 before forming the crimped portion 9 and other parts of the hub unit bearing are assembled together, they are supported by a support jig 18 which is provided at the top surface of the elevating base 11 in a state where the hub body 6 does not rattle in the radial direction and the center axis of the hub body 6 is matched to the reference axis a.

Figure 3A:
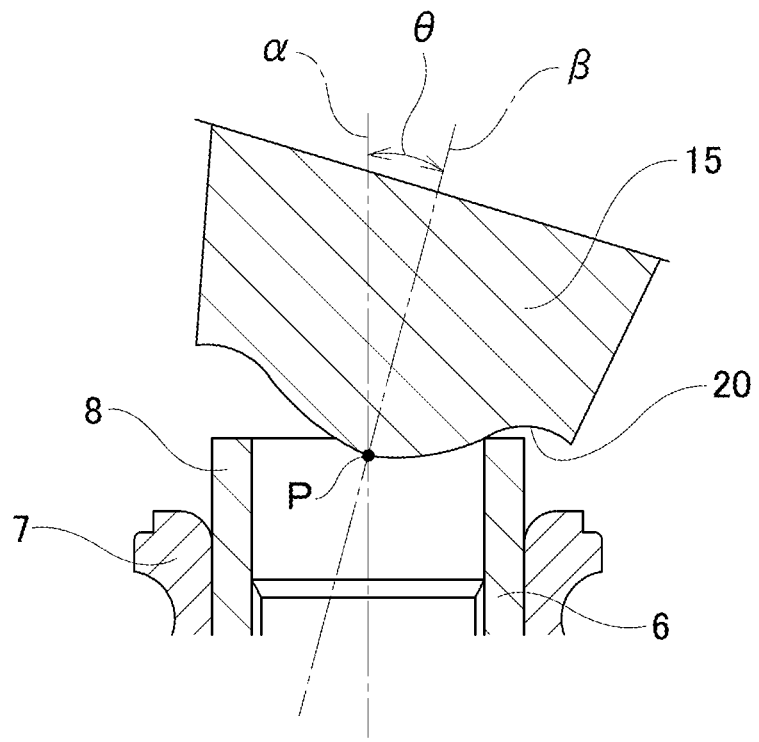
FIGS. 3(a) and 3(b) are an enlarged cross-sectional views of a main section illustrating the processes for forming the crimped portion of the hub unit bearing by the orbital forging device illustrated in FIG. 1 in order.
Figure 3B:
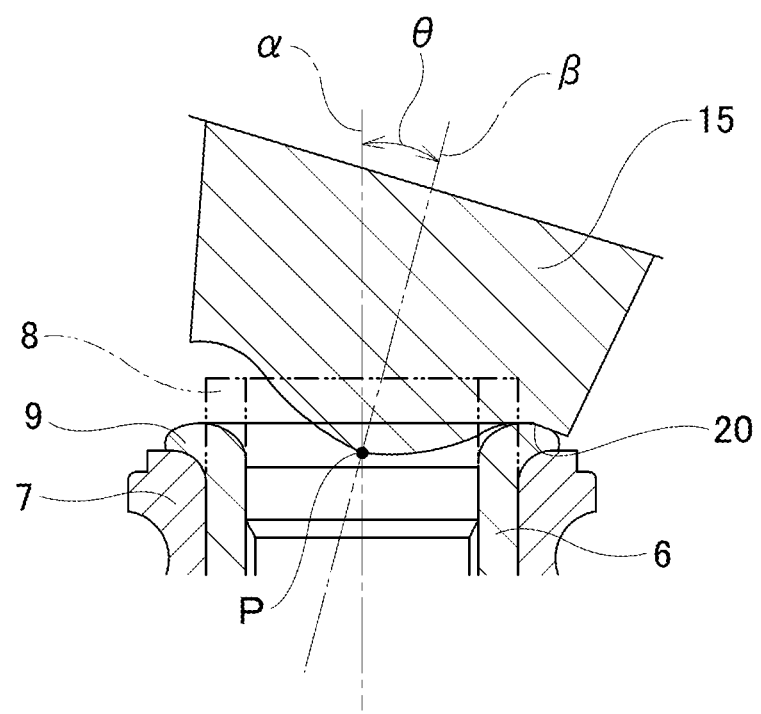
Figure 4:
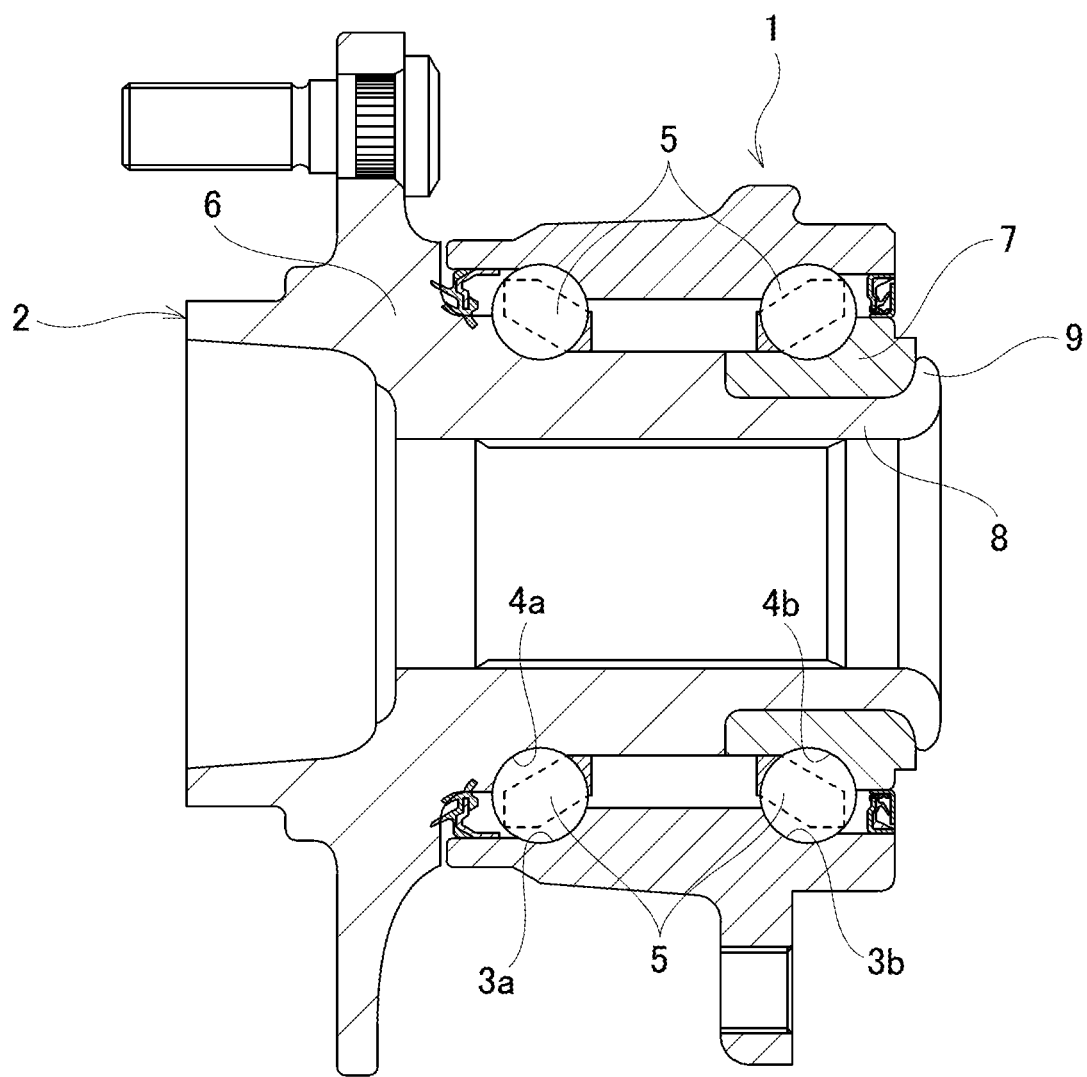
FIG. 4 is a cross-sectional view illustrating an example of a conventionally known hub unit bearing.
Figure 5:
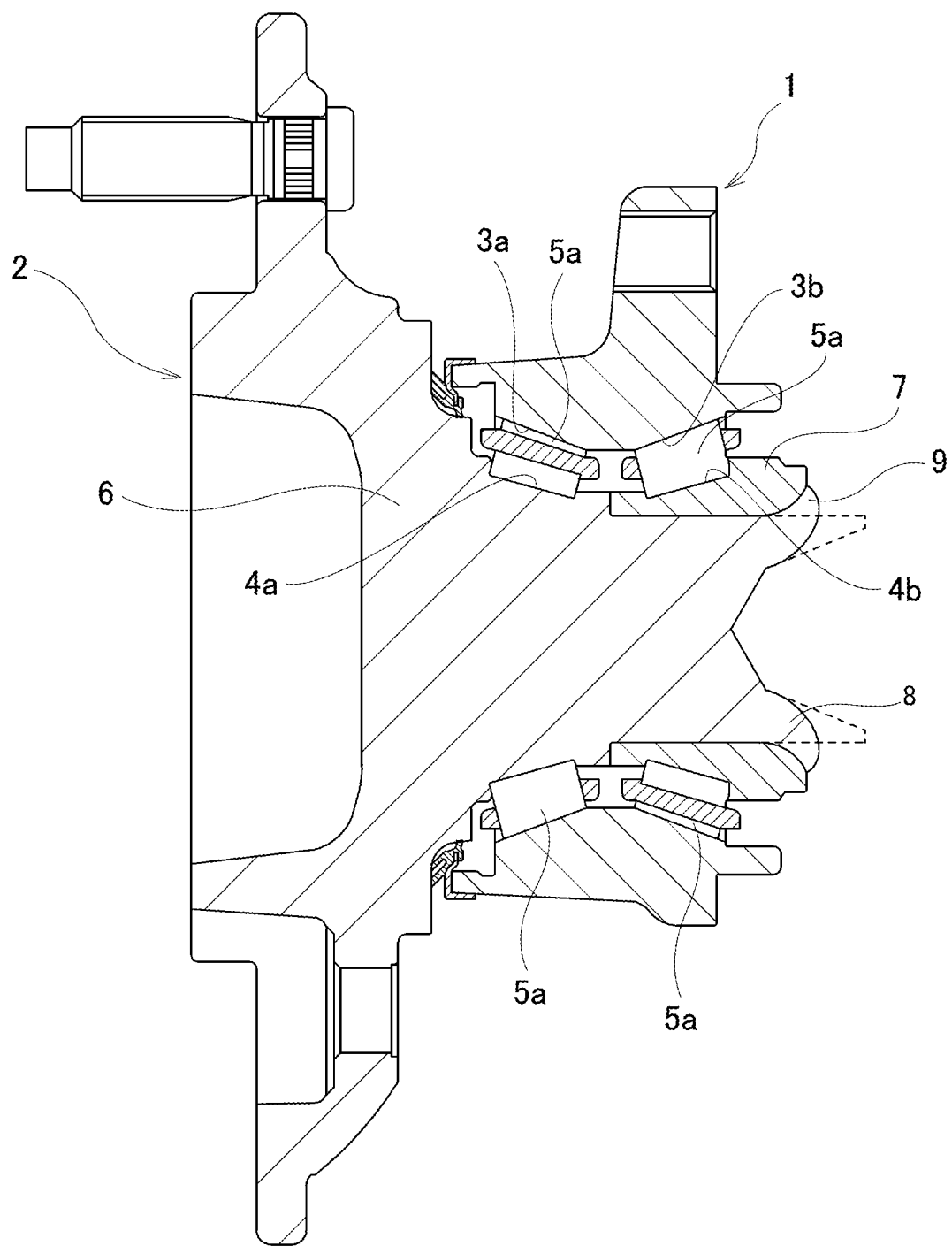
FIG. 5 is a cross-sectional view illustrating another example of a conventionally known hub unit bearing.
Figure 6:
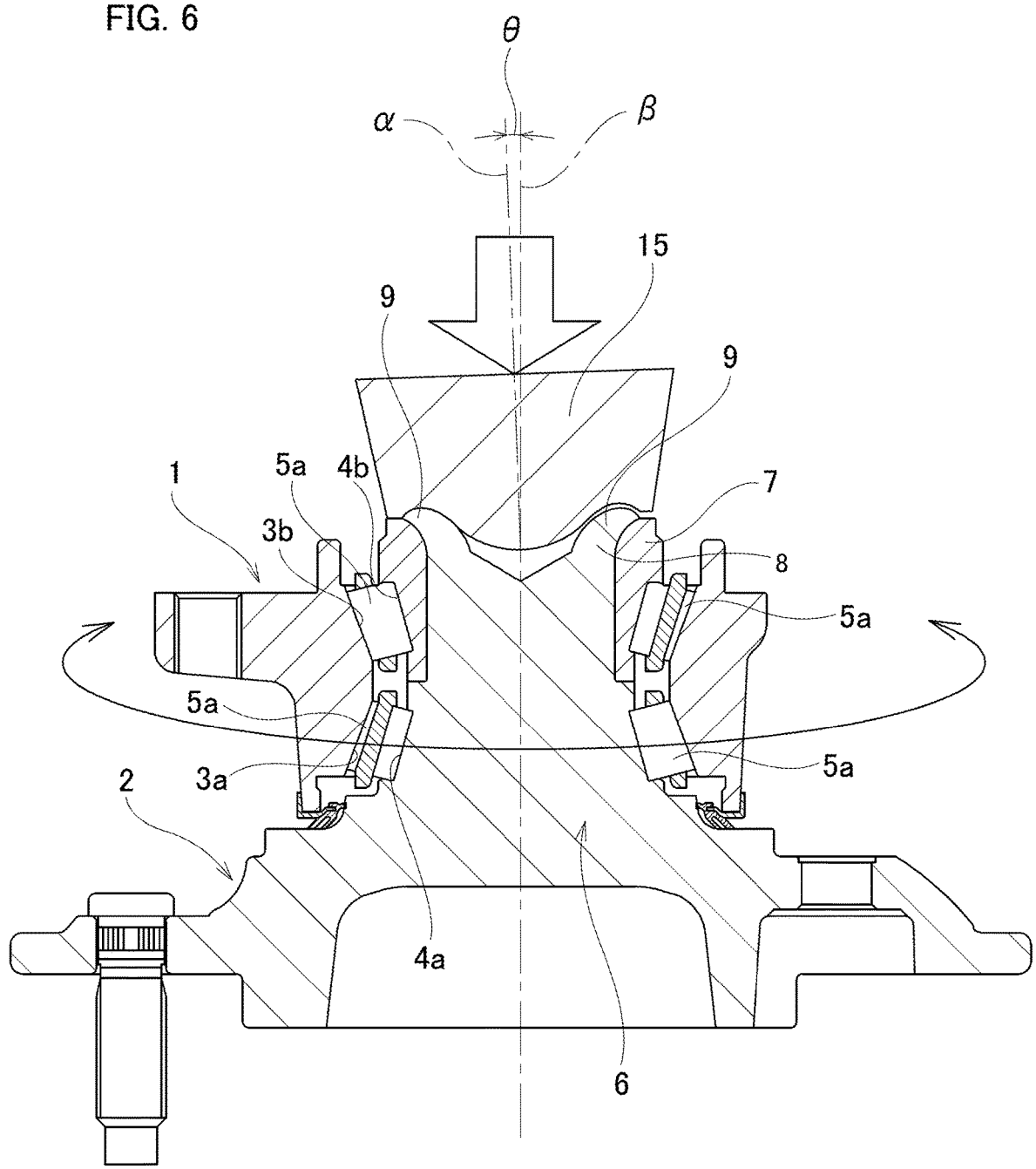
FIG. 6 is a cross-sectional view illustrating a process for forming a crimped portion of the hub unit bearing by a conventionally known orbital forging device.
Figure 7:
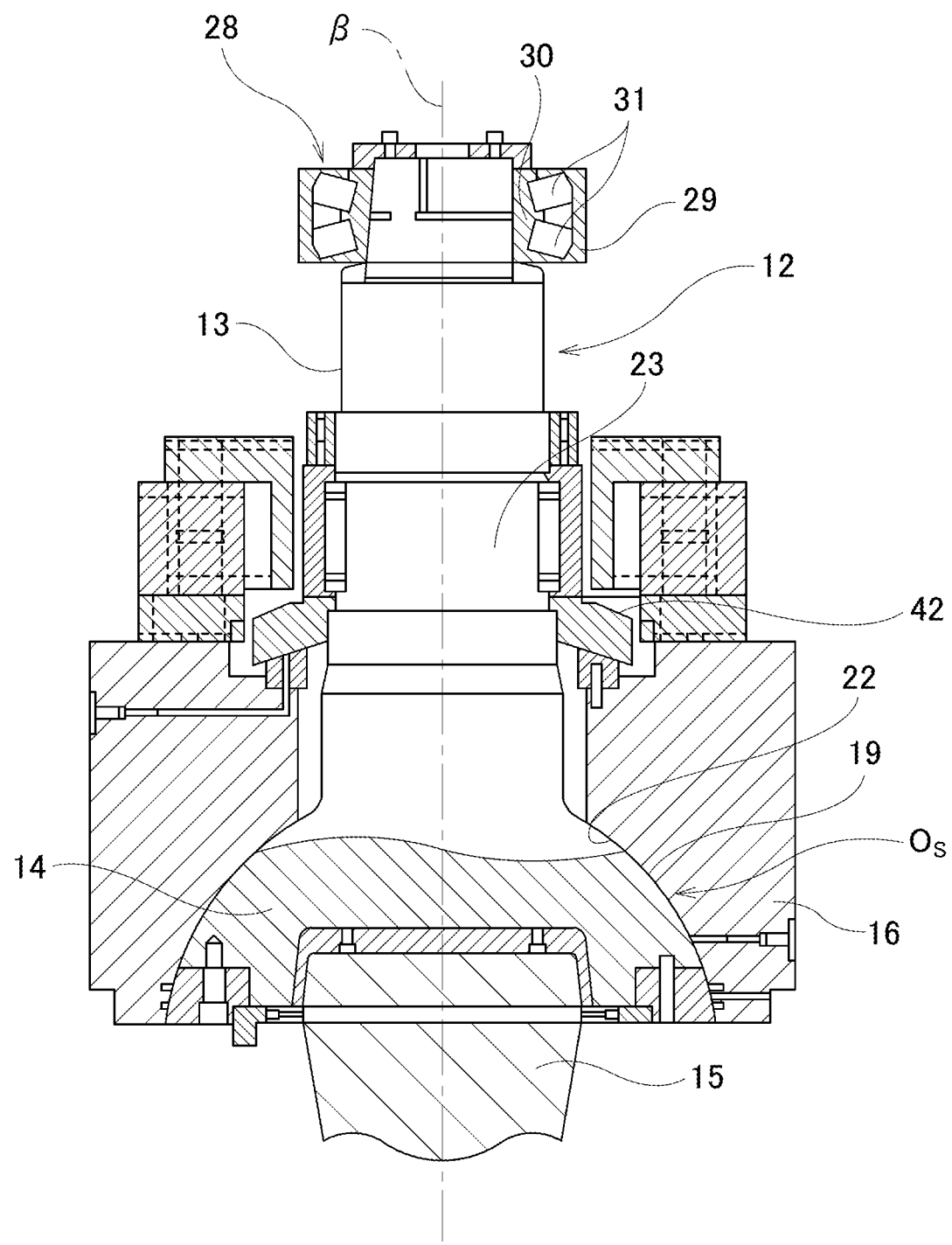
FIG. 7 is a cross-sectional view illustrating an example of a connected body of the spherical seat with shaft and the molding die of a conventionally known orbital forging device.

The elevating base 11 is lifted in this state, and as illustrated in FIG. 3(a), a part in the circumferential direction of the machining surface section 20 of the molding die 15 is pressed down to a part in the circumferential direction of the inner end section in the axial direction of the cylindrical section 8 which is provided at the inner end section in the axial direction of the hub body 6. In this state, the rotating body 26 is made rotate around the reference axis a, and the connected body 23 of the molding die 15 and the spherical seat with shaft 12 is made swing and rotate around the reference axis a, that is, based on the intersection point P of the reference axis a and the center axis 8 of the connected body 23. For example, it is also possible to provide a proximity sensor (not shown) to the orbital forging device and measure the distance between the part in the circumferential direction of the machining surface section 20 of the molding die and the part in the circumferential direction at the inner end section in the axial direction of the cylindrical section 8 which is provided at the inner end section in the axial direction of the hub body 6 by the proximity sensor, and at a stage of reaching a predetermined distance, that is, in a state where the molding die 15 and the cylindrical section 8 approach to each other but before in complete contact, initiate swinging and rotation of the connected body 23.

When doing this, the connected body 23 of the molding die 15 and the spherical seat with shaft 12 rotate around the center axis 8 of the connected body 23 itself based on the friction force that acts on the contact portion with the inner end section in the axial direction of the cylindrical section 8. Due to this, load toward outside in the axial direction and outside in the radial direction is applied to a section in the circumferential direction of the cylindrical section 8. By continuously changing this section to which this load is applied in the circumferential direction, as illustrated from FIG. 3(a) to FIG. 3(b) in order, the inner end section in the axial direction of the cylindrical section 8 is made gradually plastically deform so as to form the crimped portion 9. Especially, due to such orbital forging, the swing angle of the molding die 15 (inclination angle θ) when forming the crimped portion 9 is set to be 15 degrees or more and 30 degrees or less, it is possible to suppress the maximum machining load when performing this orbital forging. However, in the present invention, it is also possible to set the inclination angle θ to be at an angle which is not within the range of 15 degrees or more and 30 degrees or less.

Further, this inclination angle θ is preferably at a constant angle during the process of orbital forging. Especially, in a process illustrated in FIG. 5 for manufacturing a hub unit bearing using tapered rollers 5a as rolling elements, the inclination angle θ is set to be 15 degrees or more and 30 degrees or less and initiate orbital forging using the proximity sensor, and by maintaining the inclination angle θ during the process of orbital forging at a constant angle, it is possible to suppress machining load for forming the crimped portion 9 and make the inner ring 7 prevent the inner ring raceway 4b on the inside in the axial direction which is provided on the outer circumferential surface from plastically deforming as it bulges.

In the orbital forging device of the present example, the end section on the other side in the axial direction of the swinging shaft 13 is supported to the driving mechanism 17 in a state where the movement toward the one side in the axial direction is prevented. Therefore, due to this supporting section, it is prevented that the connected body 23 of the molding die 15 and the spherical seat with shaft 12 move toward the one side in the axial direction of the swinging shaft 13 with respect to the frame 10 (drop downwards in FIG. 1). Further, a member for preventing the swinging shaft 13 from moving toward the one side in the axial direction with respect to the frame 10, for example, a thrust sliding bearing having a partially spherical sliding surface, is not assembled in a portion of the swinging shaft 13 which is located between the convex spherical seat 14 and the driving mechanism 17 in the axial direction. Therefore, it is possible to reduce the size and manufacturing cost of the orbital forging device by that amount.

Further, in the present example, the bearing holder 36 and the holding member 37 are detachably fixed to the case member 35. Therefore, by changing the bearing holder 36 and the holding member 37 to change the inclination angle of the retention hole 27, it is possible to change the swing angle of the molding die 15 (inclination angle θ) in a wide range. Therefore, it is possible to select an optimal swing angle θ in accordance with the type of a work piece (for example, hub body 6). The insertion position of the swinging shaft 13 with respect to the through-hole 39 of the case member 35 changes according to the swing angle of the molding die 15 (inclination angle θ).

EXPLANATION OF REFERENCE NUMBERS

1 Outer ring
2 Hub
3a, 3b Outer ring raceway
4a, 4b Inner ring raceway
6 Balls
5a Tapered rollers
6 Hub body
7 Inner ring
8 Cylindrical section
9 Crimped portion
10 Frame
11 Elevating base
12 Spherical seat with shaft
13 Swinging shaft
14 Convex spherical seat
15 Molding die
16 Concave spherical seat
17 Driving mechanism
18 Support jig
19 Convex spherical surface section
20 Machining surface section
21 Insertion hole
22 Concave spherical surface section
23 Connected body
24 Stepped hole
25 Bearing device
26 Rotating body
27 Retention hole
28 Rolling bearing
29 Outer ring
30 Inner ring
31 Spherical rollers
32 Stepped surface
33 Male screw section
34 Nut
35 Case member
36 Bearing holder
37 Holding member
38 Holding recess
39 Through-hole
40 First inclined surface section
41 Second inclined surface section
42 Thrust sliding bearing

What is claimed is:

1. A method for orbital forging using an orbital forging device, comprising:
a frame having a reference axis,
a swinging shaft having a center axis, an end section on one side in an axial direction thereof, and an end on the other side in the axial direction, the center axis arranged to be inclined with respect to the reference axis,
a convex spherical seat having one side section in the axial direction of the swinging shaft, the other side section in the axial direction of the swinging shaft, and a convex spherical surface section provided on the other side section, the convex spherical seat connected to the end section on the one side in the axial direction of the swinging shaft to be coaxial with the swinging shaft,
a molding die comprising a machining surface section in a side surface on the one side in the axial direction of the swinging shaft, the molding die connected to the side surface on the one side of the convex spherical seat to be coaxial with the swinging shaft, a concave spherical seat fixed to the frame and comprising a concave spherical surface section which spherically engages with the convex spherical surface section and an insertion hole to which the swinging shaft is inserted, and a driving mechanism assembled in the frame and connected to the end section on the other side in the axial direction of the swinging shaft to provide driving force to the end section on the other side in the axial direction of the swinging shaft for rotating a connected body of the swinging shaft, the convex spherical seat, and the molding die around the reference axis, wherein the driving mechanism comprises a rotating body supported to the frame rotatably around the reference axis, a retention hole provided in the rotating body and to which the end section on the other side in the axial direction of the swinging shaft is inserted, and a rolling bearing provided between the retention hole and the end section on the other side in the axial direction of the swinging shaft, and the end section on the other side in the axial direction of the swinging shaft is supported to the rotating body by the rolling bearing in a state where a movement thereof toward the one side in the axial direction is prevented, the end section on the other side in the axial direction of the swinging shaft supported with respect to the driving mechanism in a state where a movement thereof toward the one side in the axial direction is prevented, and the rotating body has a case member supported to the frame to rotate around the reference axis, and a bearing holder having the retention hole, the bearing holder detachably fixed to the case member, wherein the method of orbital forging comprises a step of plastically deforming a cylindrical section provided in an end section in an axial direction of a shaft member outward in a radial direction thereof to form a crimped portion, wherein by using the orbital forging device, the molding die is pressed down to the end section in the axial direction of the cylindrical section of the shaft member in a state where the center axis of the molding die is inclined to the center axis of the shaft member to a predetermined angle and the rotating body, supporting the swinging shaft, is rotated.

2. The method for orbital forging according to claim 1, wherein the inclination angle of the center axis of the molding die with respect to the center axis of the shaft member is set to be 15 degrees or more and 30 degrees or less.

3. A method for manufacturing a hub unit bearing using an orbital forging device, comprising:

a frame having a reference axis, a swinging shaft having a center axis, an end section on one side in an axial direction thereof, and an end on the other side in the axial direction, the center axis arranged to be inclined with respect to the reference axis, a convex spherical seat having one side section in the axial direction of the swinging shaft, the other side section in the axial direction of the swinging shaft, and a convex spherical surface section provided on the other side section, the convex spherical seat connected to the end section on the one side in the axial direction of the swinging shaft to be coaxial with the swinging shaft, a molding die comprising a machining surface section in a side surface on the one side in the axial direction of the swinging shaft, the molding die connected to the side surface on the one side of the convex spherical seat to be coaxial with the swinging shaft, a concave spherical seat fixed to the frame and comprising a concave spherical surface section which spherically engages with the convex spherical surface section and an insertion hole to which the swinging shaft is inserted, and a driving mechanism assembled in the frame and connected to the end section on the other side in the axial direction of the swinging shaft to provide driving force to the end section on the other side in the axial direction of the swinging shaft for rotating a connected body of the swinging shaft, the convex spherical seat, and the molding die around the reference axis, wherein the driving mechanism comprises a rotating body supported to the frame rotatably around the reference axis, a retention hole provided in the rotating body and to which the end section on the other side in the axial direction of the swinging shaft is inserted, and a rolling bearing provided between the retention hole and the end section on the other side in the axial direction of the swinging shaft, and the end section on the other side in the axial direction of the swinging shaft is supported to the rotating body by the rolling bearing in a state where a movement thereof toward the one side in the axial direction is prevented, the end section on the other side in the axial direction of the swinging shaft supported with respect to the driving mechanism in a state where a movement thereof toward the one side in the axial direction is prevented, and the rotating body has a case member supported to the frame to rotate around the reference axis, and a bearing holder having the retention hole, the bearing holder detachably fixed to the case member, wherein the hub unit bearing comprises:

an outer ring that does not rotate in use in a state of being connected and fastened to a suspension, a hub that rotates together with a wheel in use in a state where the wheel is supported and fastened thereto, and a plurality of rolling elements rollingly provided between double-row outer ring raceways provided on an inner circumferential surface of the outer ring and double-row inner ring raceways provided on an outer circumferential surface of the hub, the hub comprising a hub body having an inner ring raceway on an outside in an axial direction of the double-row inner ring raceways on an outer circumferential surface thereof and an inner ring having an inner ring raceway on an inside in the axial direction of the double-row inner ring raceway on an outer circumferential surface thereof, the hub body and the inner ring fastened and fixed to each other, and the method for manufacturing the hub unit bearing comprising a step of plastically deforming an inner end section in an axial direction of a cylindrical section provided on an inner end section in an axial direction of the hub body outward in a radial direction with the inner ring externally fitted onto a section near an inner end in the axial direction of the hub body using the orbital forging device by pressing the molding die down to the end section in the axial direction of the cylindrical section of the shaft member in a state where the center axis of the molding die is inclined to the center axis of the shaft member and the rotating body, supporting the swinging shaft, is rotated to form a crimped portion and to make the crimped portion press down an inner end surface in the axial direction of the inner ring.

4. A method for manufacturing a vehicle, the vehicle having a structure in which a wheel is rotatably supported to a suspension of the vehicle by a hub unit bearing, wherein the manufacturing method comprises a step of manufacturing the hub unit bearing by using the method for manufacturing the hub unit bearing according to claim 3.

* * * * *